US012560447B2

(12) United States Patent
Andersen et al.

(10) Patent No.: US 12,560,447 B2
(45) Date of Patent: Feb. 24, 2026

(54) GRAPH EXPLORATION FORWARD SEARCH

(71) Applicant: Motional AD LLC, Boston, MA (US)

(72) Inventors: Hans Andersen, Singapore (SG);
Bence Cserna, Singapore (SG)

(73) Assignee: Motional AD LLC, Boston, MA (US)

( * ) Notice: Subject to any disclaimer, the term of this patent is extended or adjusted under 35 U.S.C. 154(b) by 146 days.

(21) Appl. No.: 18/152,047

(22) Filed: Jan. 9, 2023

(65) Prior Publication Data

US 2024/0125608 A1      Apr. 18, 2024

Related U.S. Application Data

(60) Provisional application No. 63/416,396, filed on Oct. 14, 2022.

(51) Int. Cl.
*G01C 21/34* (2006.01)
*G06N 5/022* (2023.01)
(52) U.S. Cl.
CPC ......... *G01C 21/3492* (2013.01); *G06N 5/022* (2013.01)
(58) Field of Classification Search
CPC ............ G01C 21/3492; G01C 21/3446; G06N 5/022; B60W 30/0956; B60W 60/0011
USPC ....................................................... 701/414
See application file for complete search history.

(56) References Cited

U.S. PATENT DOCUMENTS

| | | | |
|---|---|---|---|
| 2020/0082248 A1 | 3/2020 | Villegas et al. | |
| 2020/0269843 A1 | 8/2020 | Wissing et al. | |
| 2022/0250641 A1 * | 8/2022 | Seegmiller | B60W 30/18163 |
| 2022/0274625 A1 * | 9/2022 | Garimella | G06N 3/04 |

OTHER PUBLICATIONS

[No Author Listed], "Surface Vehicle Recommended Practice: Taxonomy and Definitions for Terms Related to Driving Automation Systems for On-Road Motor Vehicles," SAE International, Standard J3016, Sep. 30, 2016, 30 pages.
International Search Report and Written Opinion in International Appln. No. PCT/US2023/034791, mailed on Jan. 22, 2024, 14 pages.
International Preliminary Report on Patentability in International Appln. No. PCT/US2023/034791, mailed on Apr. 24, 2025, 9 pages.

* cited by examiner

*Primary Examiner* — Isaac G Smith
(74) *Attorney, Agent, or Firm* — Fish & Richardson P.C.

(57) ABSTRACT

Provided are methods for graph forward search exploration, which can include detecting a plurality of obstacles along a first trajectory of a vehicle. Some methods described also include determining a plurality of valid combinations of a plurality of trajectories to handle the plurality of obstacles. Some methods described also include generating a reduced decision tree based at least on the valid combinations of the plurality of trajectories by at least excluding a second trajectory of the plurality of trajectories associated with an obstacle of a plurality of obstacles based on a position of the obstacle being outside of a corridor defined by a spatial range and/or a temporal range. Some methods described also include selecting an optimal trajectory of the vehicle from the plurality of trajectories of the reduced decision tree. Systems and computer program products are also provided.

18 Claims, 10 Drawing Sheets

806 Trajectory

804 Vehicle

802 Obstacles

802 Obstacles

800

900

804 Vehicle

908 Optimal Trajectory

906 Initial Trajectory

Stop Behind

802 Obstacle

1000

804 Vehicle

1006 Initial Trajectory

1008 Optimal Trajectory

Overtake

1010 Corridor

802 Obstacle

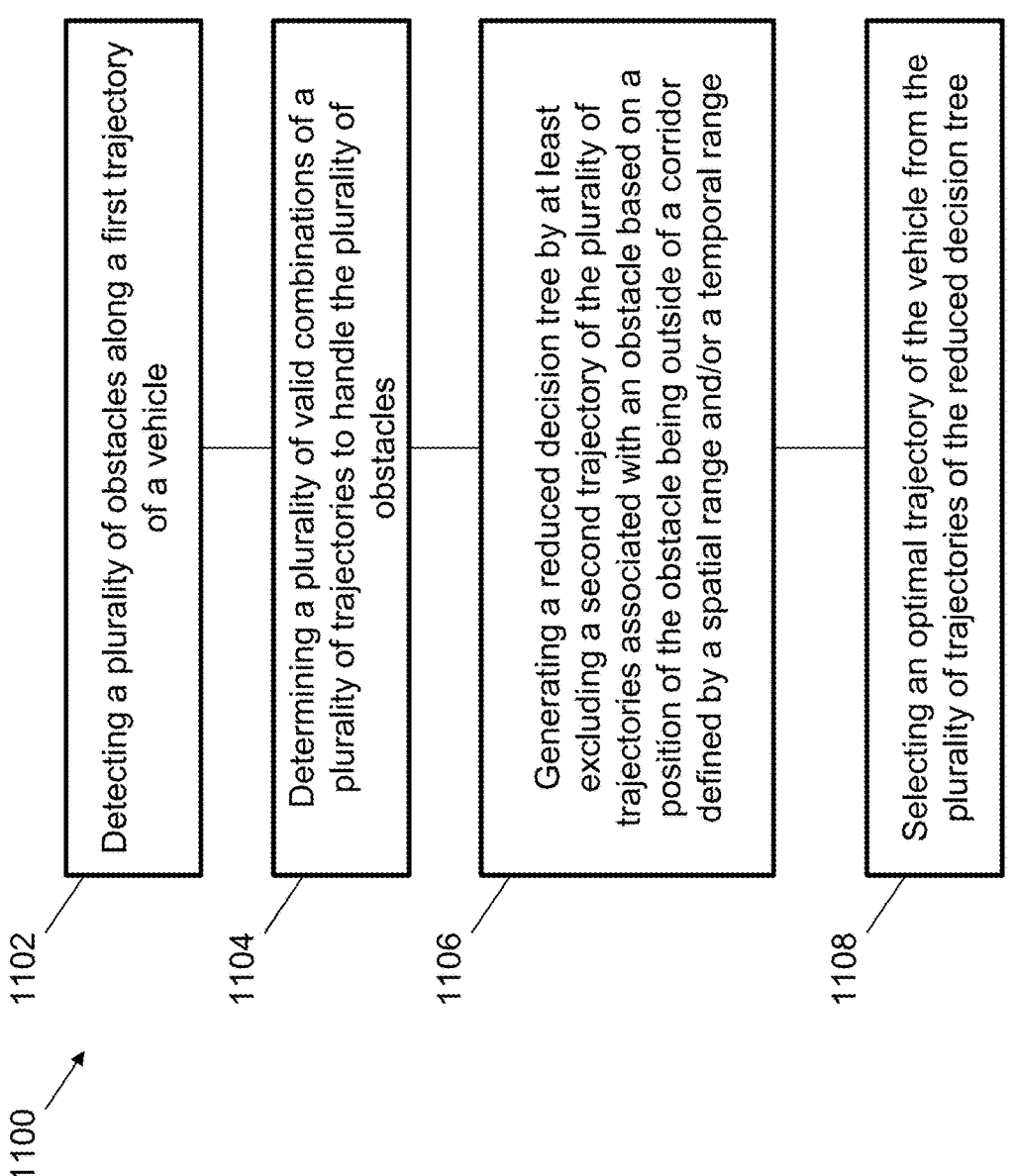

1102 — Detecting a plurality of obstacles along a first trajectory of a vehicle

1104 — Determining a plurality of valid combinations of a plurality of trajectories to handle the plurality of obstacles 1106 — Generating a reduced decision tree by at least excluding a second trajectory of the plurality of trajectories associated with an obstacle based on a position of the obstacle being outside of a corridor defined by a spatial range and/or a temporal range 1108 — Selecting an optimal trajectory of the vehicle from the plurality of trajectories of the reduced decision tree

GRAPH EXPLORATION FORWARD SEARCH

CROSS-REFERENCE TO RELATED APPLICATIONS

The present application claims priority to U.S. Provisional Application No. 63/416,396, filed Oct. 14, 2022, and entitled, "Graph Exploration Forward Search," the entirety of which is incorporated by reference herein.

BACKGROUND

Generally, a vehicle moves along a trajectory. When obstacles, such as other vehicles, are detected along the trajectory, conventional systems consider all possible combinations of maneuvers (e.g., overtaking the obstacles and/or stopping behind the obstacles) for approaching the obstacle. Consideration of an extremely large number of possible combinations is computationally expensive, inefficient, and slow, particularly in a complex environment.

BRIEF DESCRIPTION OF THE FIGURES

FIG. 11 is a flowchart of a process for graph exploration forward search.

DETAILED DESCRIPTION

Figure 1:
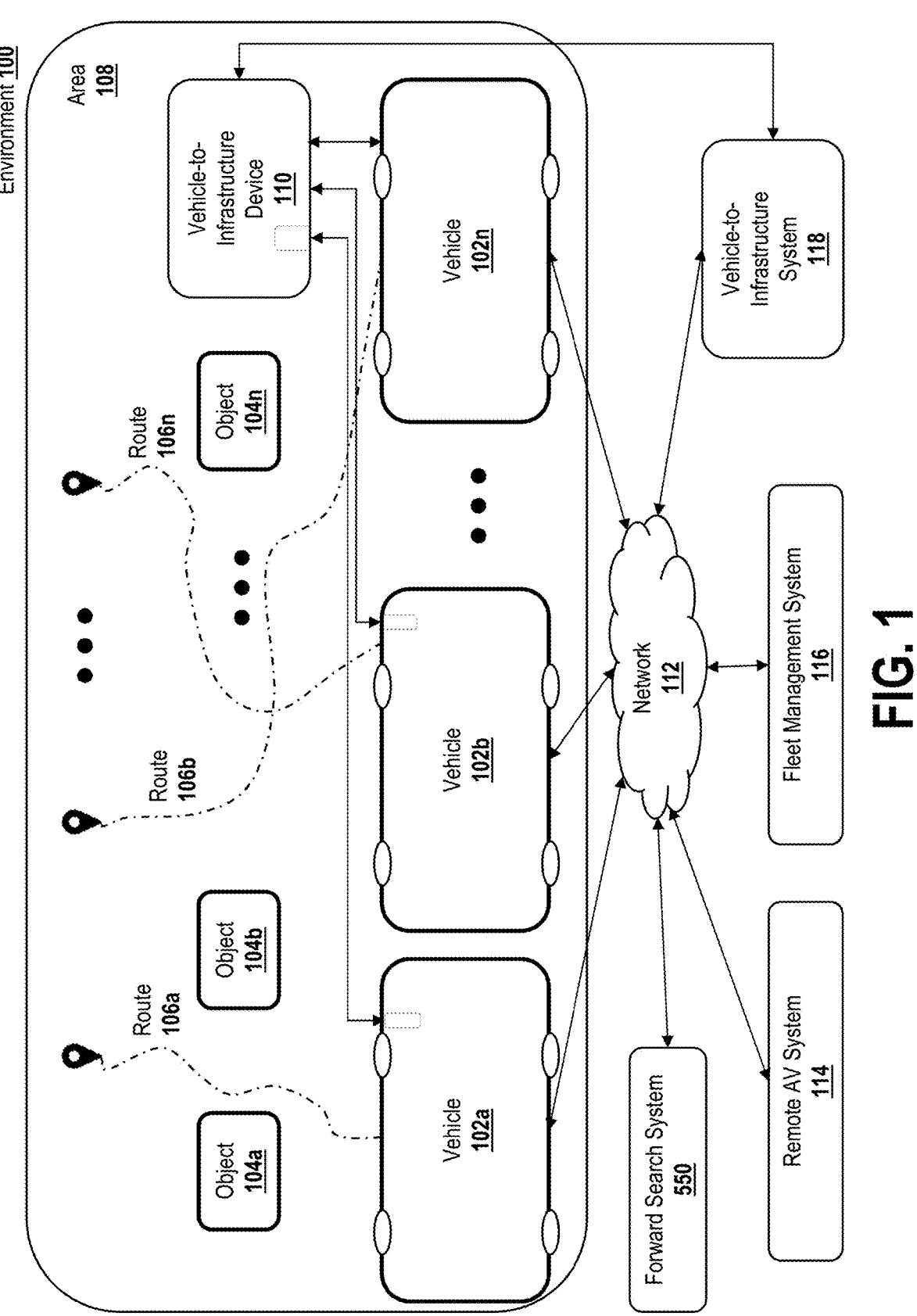
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement graph exploration forward search. For example, when handling obstacles along a current trajectory of a vehicle, the system may cause the vehicle to overtake the obstacles or stop behind at least one of the obstacles. To select an optimal maneuver or combination of maneuvers indicating whether the vehicle will overtake a particular obstacle or stop behind the obstacle, the system generates a reduced decision tree including all valid combinations of maneuvers. The system further generates the reduced decision tree by at least excluding combinations that are irrelevant or are otherwise unreachable by the vehicle. This results in a reduced set of possible combinations for faster and more efficient consideration.

By virtue of the implementation of systems, methods, and computer program products described herein, techniques for forward search graph exploration are provided. Some advantages of the described techniques include a significant reduction in computational requirements compared to conventional systems. In some examples, by virtue of the implementation of systems and methods described herein, the computational resources consumed by an autonomous system of an autonomous vehicle when planning operation of the autonomous vehicle through an environment are reduced. This allows for reallocation of the otherwise used computing resources on other tasks performed by the autonomous system. The system also quickly and efficiently selects an optimal trajectory of the vehicle (e.g., the autonomous vehicle) based on a reduced set of possible combinations of trajectories. This allows for the vehicle to quickly and efficiently address obstacles in the environment in which the vehicle is operating.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, V2I system 118, and forward search system 550. Vehicles 102a-102n, vehicle-to-infrastructure (V2I) device 110, network 112, autonomous vehicle (AV) system 114, fleet management system 116, V2I system 118, and forward search system 550 (described in more detail with respect to FIGS. 5-11) interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, V2I system 118, and forward search system 550 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, V2I system 118, and/or forward search system 550 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
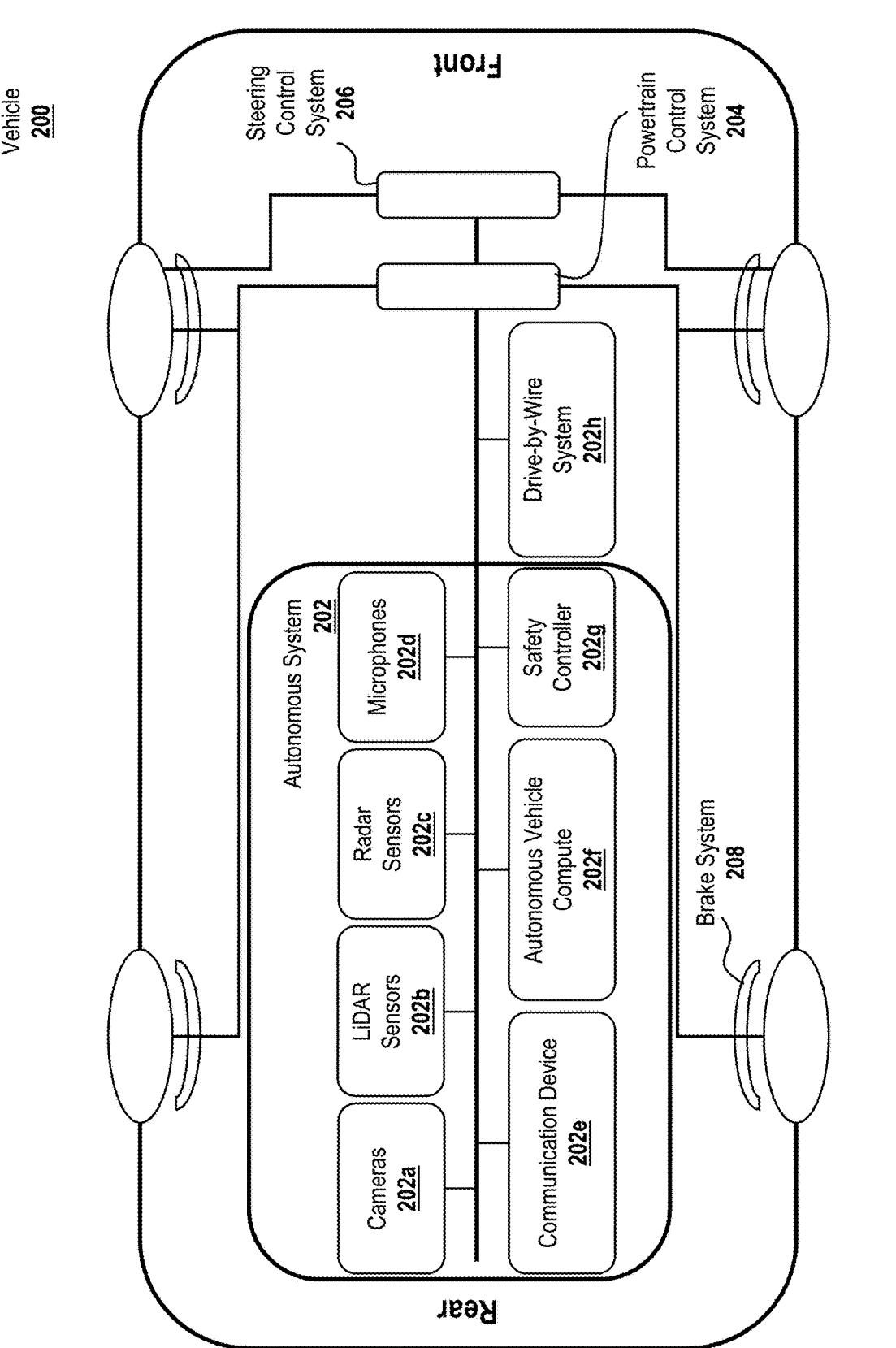
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operation or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features.

Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
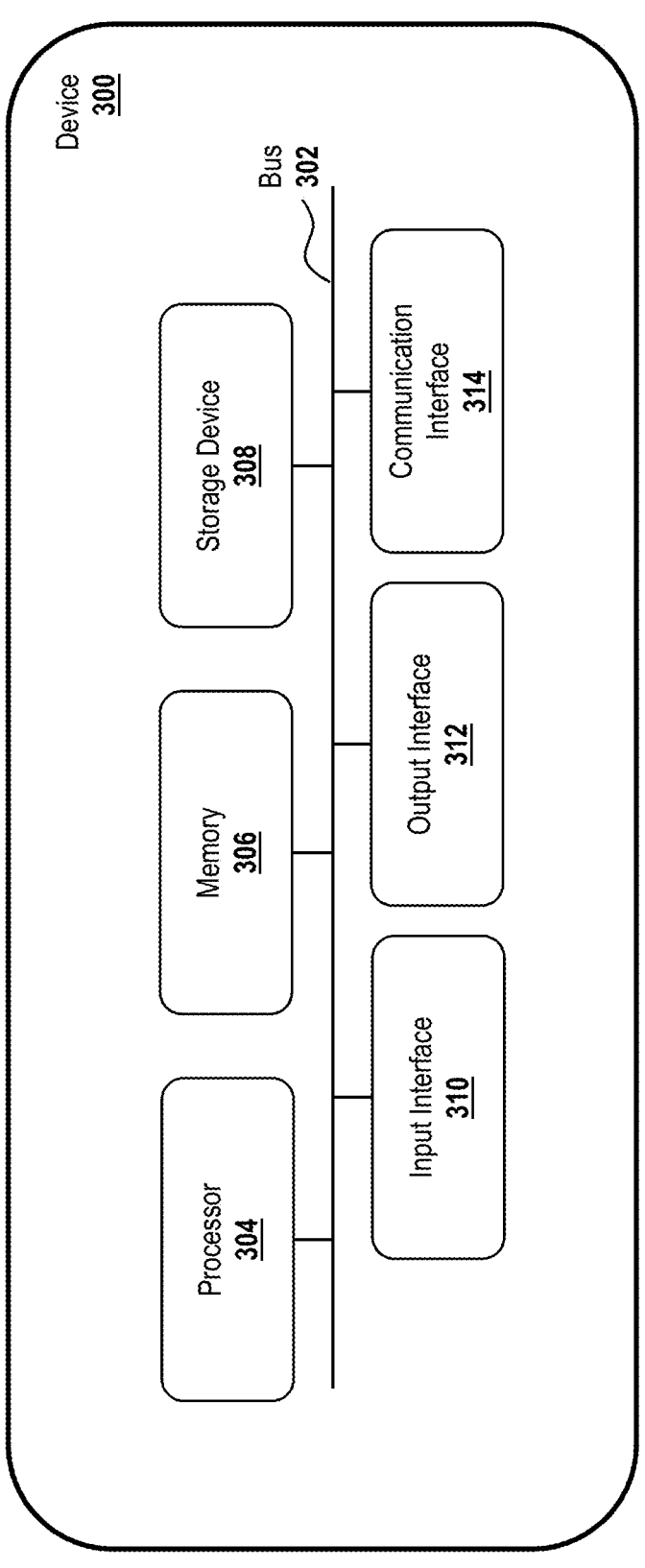
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charged-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* includes at least one device configured to be in communication with cameras 202*a*, LiDAR sensors 202*b*, radar sensors 202*c*, microphones 202*d*, autonomous vehicle compute 202*f*, safety controller 202*g*, and/or DBW (Drive-By-Wire) system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of forward search system 550 (e.g., at least one device of a system of the forward search system 550), and/or one or more devices of network 112 (e.g., one or more devices of a system of network 112). In some embodiments, one or more devices of vehicles 102 (e.g., one or more devices of a system of vehicles 102), at least one device of forward search system 550 (e.g., at least one device of a system of the forward search system 550), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
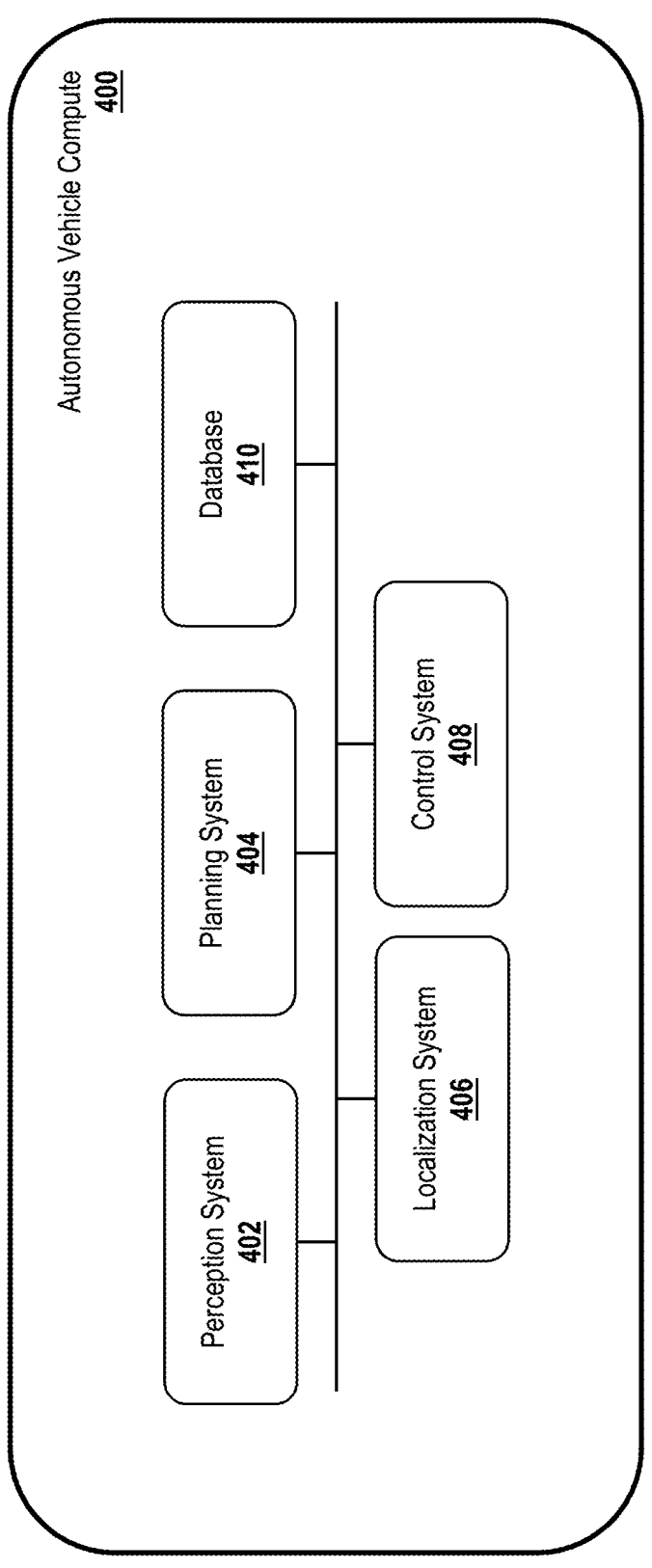
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 5:
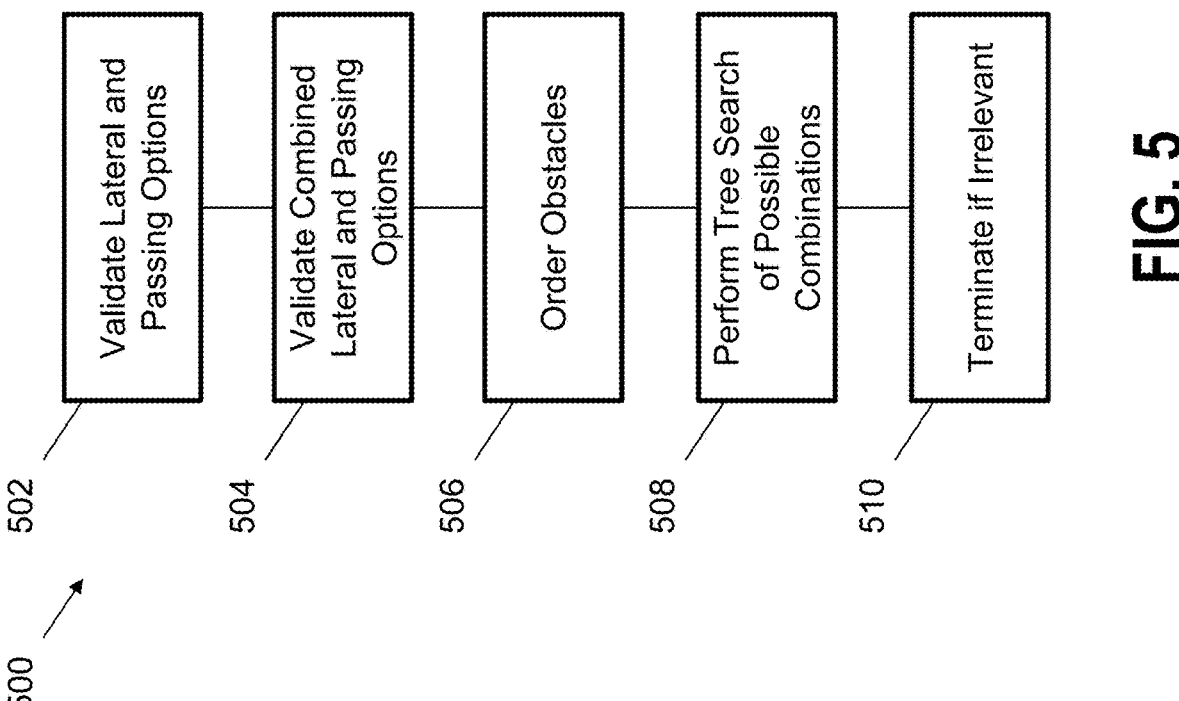
FIG. 5 is a flowchart of a process for graph exploration forward search.

Referring to FIG. 5, illustrated is a flowchart of a process 500 for graph exploration forward search. In some embodiments, one or more of the steps described with respect to a process 500 are performed (e.g., completely, partially, and/ or the like) by forward search system 550 (see FIG. 1). In an embodiment, forward search system 550 is included in autonomous vehicle compute 400, one or more other systems described with respect to environment 100, and/or the like. Forward search system 550 can be implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware.

Additionally or alternatively, in some embodiments, one or more steps described with respect to a processes 500 are performed (e.g., completely, partially, and/or the like) by another device or group of devices separate from or including forward search system 550 such as vehicles 102*a*-102*n* and/or vehicles 200, vehicle-to-infrastructure (V2I) device 110, network 112, remote autonomous vehicle (AV) system 114, fleet management system 116, V2I system 118, and/or planning system 404. In some embodiments, forward search system 550 includes, forms a part of, is coupled to, and/or uses vehicles 102*a*-102*n* and/or vehicles 200, objects 104*a*-104*n*, routes 106*a*-106*n*, area 108, vehicle-to-infrastructure (V2I) device 110, network 112, remote autonomous vehicle (AV) system 114, fleet management system 116, V2I system 118, and/or planning system 404. In some embodiments, forward search system 550 is the same as or similar to vehicles 102*a*-102*n* and/or vehicles 200, objects 104*a*-104*n*, routes 106*a*-106*n*, area 108, vehicle-to-infrastructure (V2I) device 110, network 112, remote autonomous vehicle (AV) system 114, fleet management system 116, V2I system 118, and/or planning system 404.

In an embodiment, the forward search system 550 detects a plurality of obstacles along a trajectory (e.g., a sequence of actions connecting states along which a vehicle can navigate) of a particular vehicle. While a vehicle 804 is referenced with respect to FIGS. 5-11, the vehicle 804 can also include the vehicles 102*a*-102*n*, the vehicle 200, other vehicles described herein, and/or portions thereof.

Figure 8:
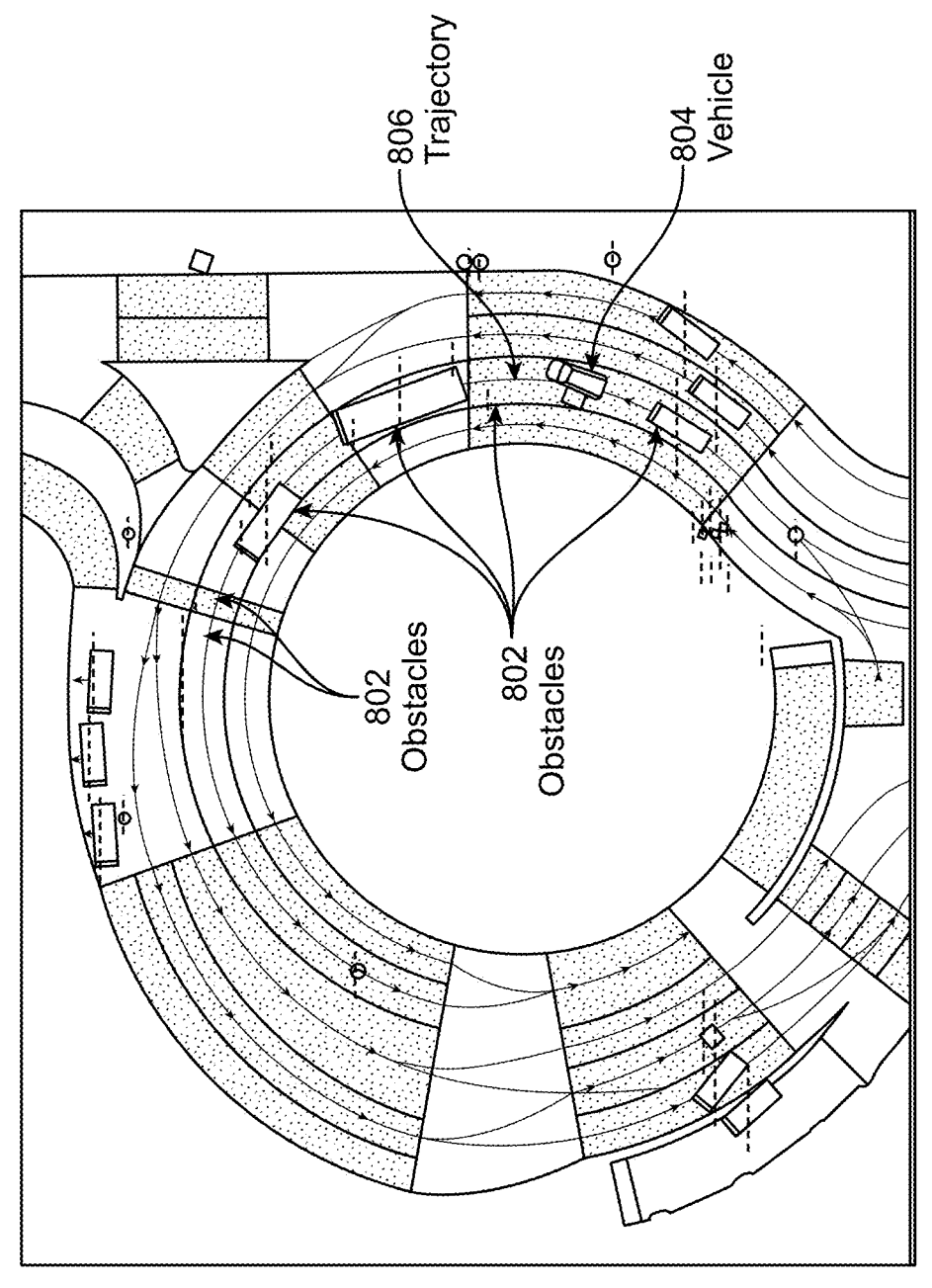
FIG. 8 is a diagram of an example of a vehicle navigating a roadway.

FIG. 8 is a diagram 800 of an example of a vehicle 804 navigating a roadway along a trajectory 806. As shown in FIG. 8, the trajectory 806 for the vehicle 804 includes a plurality of obstacles 802. The plurality of obstacles 802 include at least one, two, three, four, five, ten, or more obstacles. The plurality of obstacles 802 are positioned at any point along the trajectory 806. For example, the plurality of obstacles 802 can be positioned behind, to the left, and/or to the right of the vehicle 804. The plurality of obstacles 802 include at least one other vehicle on the roadway. In an embodiment, the plurality of obstacles 802 are and/or include the objects 104*a*-104*n*.

Figure 9:
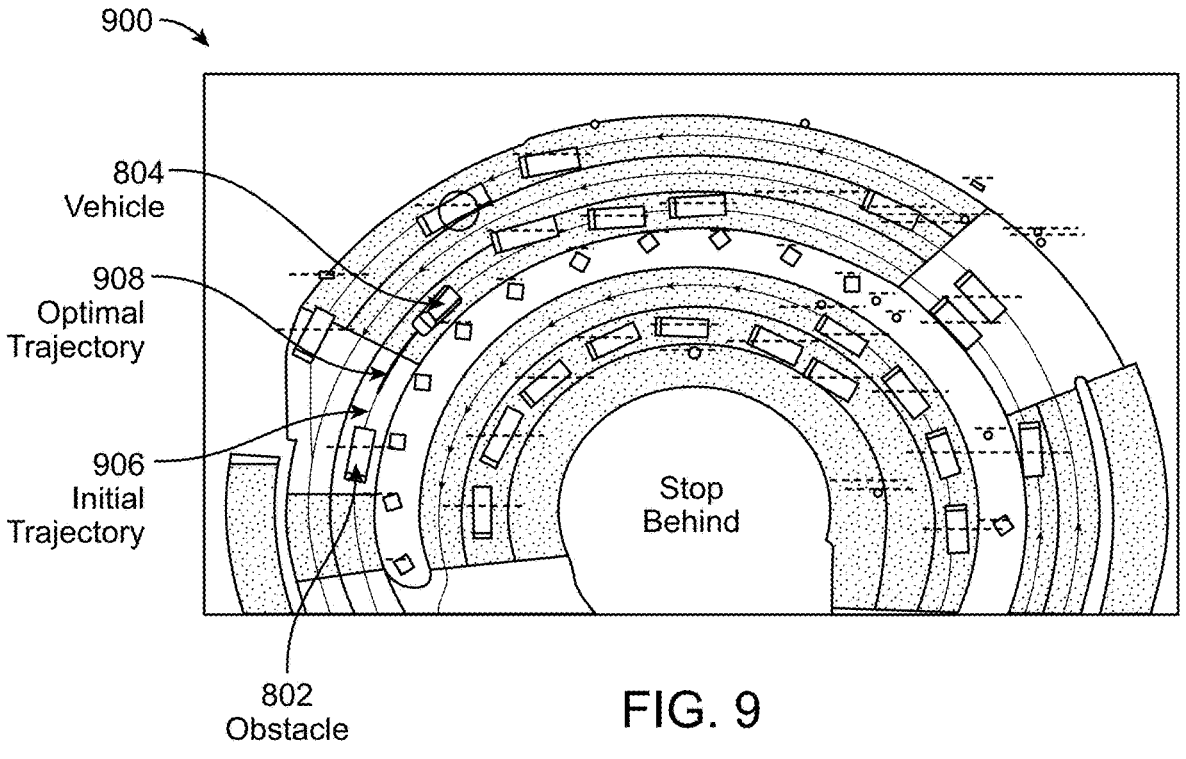
FIG. 9 is a diagram of an example of a vehicle navigating a roadway.
Figure 10:
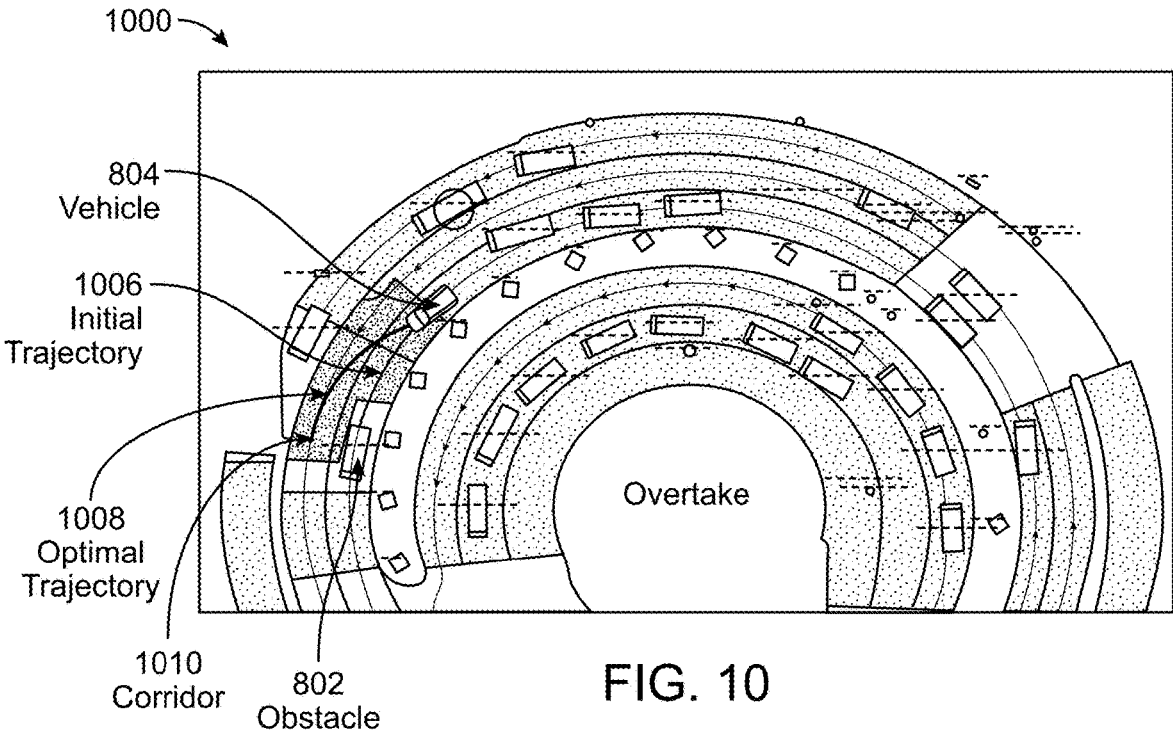
FIG. 10 is a diagram of an example of an autonomous vehicle navigating a roadway.

Generally, when the vehicle 804 approaches the plurality of obstacles 802, the forward search system 550 determines an optimal trajectory from a plurality of trajectories for addressing the plurality of obstacles 802. FIG. 9 is a diagram 900 of an example of the vehicle 804 navigating a roadway and FIG. 10 is another diagram 1000 of an example of the vehicle 804 vehicle navigating a roadway. Referring to FIG. 9, the vehicle 804 follows along an initial trajectory 906, and the forward search system 550 determines an optimal trajectory 908 based at least on the obstacle 802. Referring to FIG. 10, the vehicle 804 follows along an initial trajectory 1006, and the forward search system 550 determines an optimal trajectory 1008 based at least on the obstacle 802 and within a corridor 1010 (described in more detail below).

The plurality of trajectories include at least one trajectory representing a passing maneuver (e.g., ignore, overtake, pass before, pass after, etc.) and/or at least one trajectory representing a lateral (e.g., side) maneuver (e.g., ignore, undefined, left lane boundary crossing, right lane boundary crossing, left within lane, right within lane, etc.) for each obstacle of the plurality of obstacles 802. In other words, as the vehicle 804 approaches each obstacle of the plurality of obstacles 802, the forward search system 550 determines whether the vehicle 804 should pass or overtake the obstacle, stop behind the obstacle, follow the obstacle, move to the left or right of the obstacle, and/or the like. The number of decisions made by the forward search system 550 can expand quickly, such as when there are numerous obstacles 802 along the trajectory 806 of the vehicle 804. The forward search system 550 efficiently and quickly reduces the number of decisions and trajectories for consideration when determining an optimal trajectory for the vehicle 804.

In an embodiment, the ignore passing maneuver includes the vehicle 804 not overtaking the obstacle 802, staying behind the obstacle, and continuing on the current trajectory 806. In some embodiments, the ignore passing maneuver involves the vehicle 804 identifying the obstacle 802 and operating along the trajectory 806 without overtaking the obstacle 802 either for a period of time or for a certain distance.

The overtake passing maneuver includes the vehicle 804 overtaking the obstacle 802. For example, in some embodiments, the overtake passing maneuver involves the vehicle 804 identifying the obstacle 802 and operating along the trajectory 806 by moving around the obstacle 802, such as to the left or to the right of the obstacle 802. After, the vehicle 804 moves in front of the obstacle 802, such as after a period of time or after a certain distance.

The pass before passing maneuver includes the vehicle 804 passing the obstacle 802 prior to reaching a certain location along the current trajectory 806. In some embodiments, the pass before passing maneuver involves the vehicle 804 identifying the obstacle 802, such as a distance between the vehicle 804 and the obstacle 802, and identifies the certain location, such as a distance between the vehicle 804 and the certain location, along the current trajectory 806. The vehicle 804 determines an amount of time until the vehicle 804 would reach the certain location, such as based on the distance between the vehicle 804 and the certain location, the speed of the vehicle 804, and/or the like. The vehicle 804 identifies a time and/or a location along the current trajectory 806 that is prior to the certain location for the vehicle 804 to pass the obstacle 802 along the current trajectory and pass the obstacle 802 at the identified time and/or location.

The pass after passing maneuver includes the vehicle 804 passing the obstacle 802 after reaching a certain location along the current trajectory 806. In some embodiments, the pass after passing maneuver involves the vehicle 804 identifying the obstacle 802, such as a distance between the vehicle 804 and the obstacle 802, and identifies the certain location, such as a distance between the vehicle 804 and the certain location, along the current trajectory 806. In some examples, the vehicle 804 determines when the vehicle 804 has passed the certain location. The vehicle 804 operates along the current trajectory 806 by passing the obstacle 802 based at least on the determination the vehicle 804 has passed the obstacle 802, such as after a period of time or after a certain distance after passing the obstacle 802.

The ignore lateral maneuver includes the vehicle 804 ignoring the obstacle 802, staying behind the obstacle, and continuing on the current trajectory 806. In some embodiments, the ignore lateral maneuver involves the vehicle 804 identifying the obstacle 802 and operating along the trajectory 806 without overtaking the obstacle 802 or moving to the left or right of the obstacle 802, either for a period of time or for a certain distance.

The left lane boundary crossing lateral maneuver includes crossing the left lane boundary to move to the left side of the obstacle 802. In some embodiments, the left lane boundary crossing lateral maneuver involves the vehicle 804 identifying the obstacle 802 and operating along the trajectory 806 by moving to the left side of the obstacle 802 by crossing the left lane boundary, either after a period of time or distance, or within a certain distance or time from the obstacle 802.

The right lane boundary crossing lateral maneuver includes crossing the right lane boundary to move to the right side of the obstacle 802. In some embodiments, the right lane boundary crossing lateral maneuver involves the vehicle 804 identifying the obstacle 802 and operating along the trajectory 806 by moving to the right side of the obstacle 802, by crossing the right lane boundary, either after a period of time or distance, or within a certain distance or time from the obstacle 802.

The left within lane lateral maneuver includes moving to the left side of the obstacle 802 without crossing the left lane boundary. In some embodiments, the left within lane lateral maneuver involves the vehicle 804 identifying the obstacle 802 and operating along the trajectory 806 by moving to the left side of the obstacle 802 without crossing the left lane boundary, either after a period of time or distance, or within a certain distance or time from the obstacle 802.

The right within lane lateral maneuver includes moving to the right side of the obstacle 802 without crossing the right lane boundary. In some embodiments, the right within lane lateral maneuver involves the vehicle 804 identifying the obstacle 802 and operating along the trajectory 806 by moving to the right side of the obstacle 802 without crossing the right lane boundary, either after a period of time or distance, or within a certain distance or time from the obstacle 802.

As an example, in FIG. 9, the vehicle 804 performs a stop behind or ignore passing maneuver in which the vehicle 804 stays behind the obstacle 802. As another example, in FIG. 10, the vehicle 804 performs an overtake passing maneuver in which the vehicle 804 overtakes the obstacle 802.

To aid in determining an optimal trajectory for the vehicle 804, the forward search system 550 generates a reduced decision tree (e.g., reduced decision tree 700), which improves the computing speed and efficiency when determining the optimal trajectory. The forward search system 550 generates the reduced decision tree by including a plurality of valid combinations of a plurality of trajectories to handle the plurality of obstacles 802. As described herein, the reduced decision tree is a graph, a model, and/or the like. The forward search system 550 performs a forward graph exploration search of the reduced decision tree to determine an optimal trajectory from the plurality of trajectories.

Figure 6:
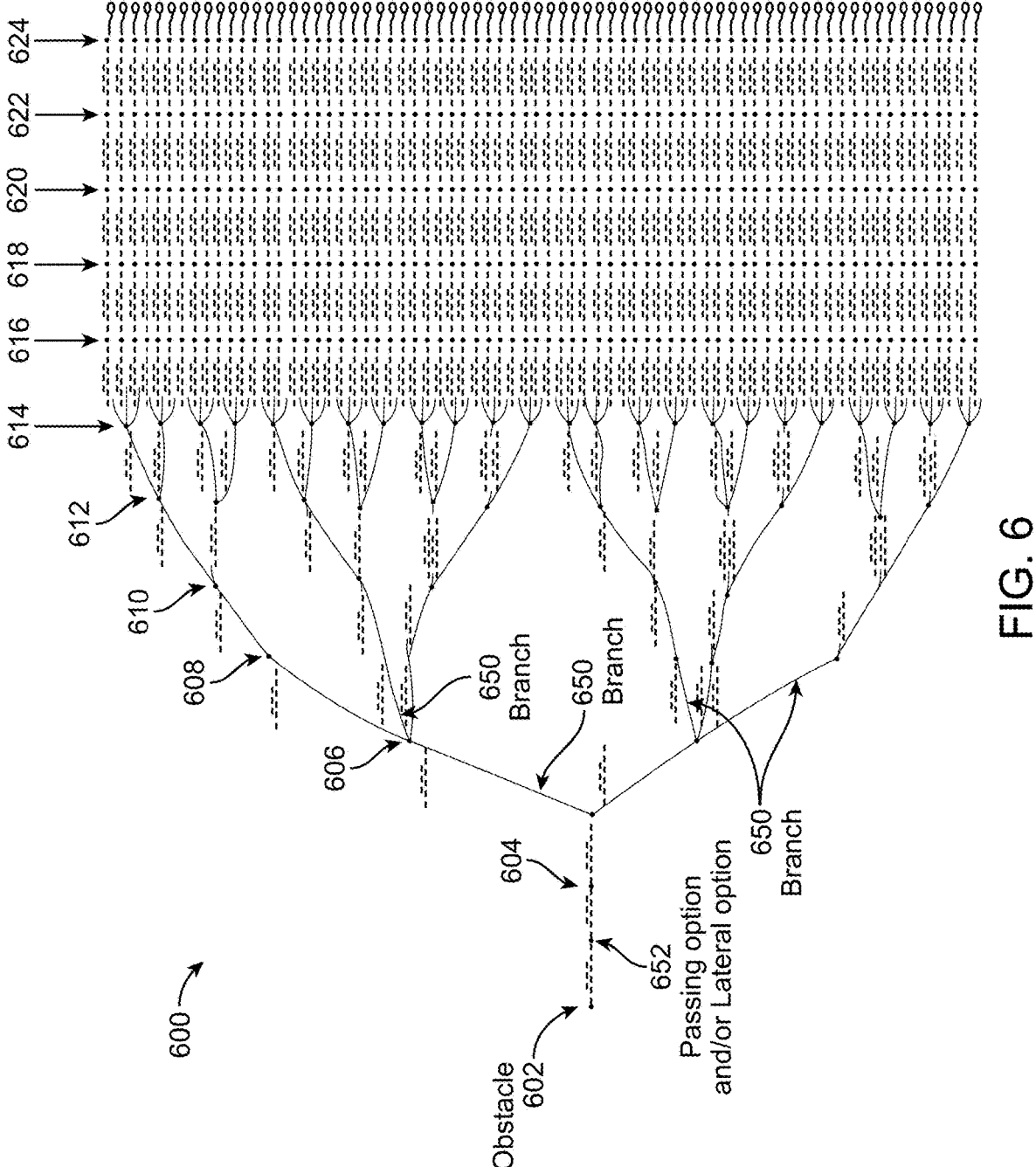
FIG. 6 is a diagram of an example decision tree.

The reduced decision tree may be reduced compared to a decision tree including all combinations of trajectories, some combinations of trajectories, and/or the like. FIG. 6 is an example diagram of a decision tree 600. The decision tree 600 includes all combinations of trajectories.

Referring to FIG. 6, the decision tree 600 includes one or more obstacles (e.g., the plurality of obstacles 802, such as an obstacle 602, 604, 606, 608, 610, 612, 614, 616, 618, 620, 622, 624, and so on), a plurality of passing maneuvers and/or lateral maneuvers (e.g., passing options and/or lateral options) 652, and a branch 650 representing various trajectories. Again referring to FIG. 6, the trajectories are represented as branches 650 of the decision tree 600.

Each of the branches 650 includes a subset of a plurality of combinations of passing maneuvers and/or lateral maneuvers for operating (e.g., maneuvering) a vehicle relative to the plurality of obstacles 802 along each branch 650. In this example, the decision tree 600 includes a plurality of columns corresponding to the plurality of obstacles and decisions (e.g., the passing maneuvers and/or lateral maneuvers) corresponding to each obstacle. Each column can be assigned a particular identifier, such as a numeric identifier, alphanumeric identifier, or the like. Referring again to FIG. 6, the plurality of columns of the decision tree 600 corresponding to each of the plurality of obstacles 802 includes an obstacle 602, 604, 606, 608, 610, 612, 614, 616, 618, 620, 622, 624, and so on. In the decision tree 600, the plurality of combinations of passing maneuvers and/or lateral maneuvers 652 is shown as a plurality of decisions.

Referring back to FIG. 5, at 502, the forward search system 550 validates possible lateral maneuvers and/or passing maneuvers. For example, the forward search system 550 separately determines whether the passing maneuver and/or the lateral maneuver is possible based on a position of the vehicle relative to a position of the particular obstacle. Accordingly, the forward search system 550 independently validates each passing maneuver and each lateral maneuver (e.g., separate from one another) for each obstacle to determine whether, for each obstacle, the passing maneuver and/or lateral maneuver is possible. The passing maneuvers and/or the lateral maneuvers that are validated as being possible are considered to be valid passing maneuvers and/or lateral maneuvers. In contrast, the passing maneuvers and/or the lateral maneuvers that are determined to be impossible, are considered as invalid passing maneuvers and/or lateral maneuvers.

The forward search system 550 determines whether each passing maneuver and/or lateral maneuver is valid based on at least a position of the vehicle 804 relative to a position of the plurality of obstacles 802 (e.g., obstacles 602, 604, 606, 608, 610, 612, 614, 616, 618, 620, 622, 624). As an example, if another vehicle (e.g., an obstacle of the plurality of obstacles 802) is positioned to the immediate left of the vehicle 804, the forward search system 550 would determine the lateral maneuver of left lane boundary crossing is not possible.

Referring to FIG. 5, at 504, the forward search system 550 validates combined lateral maneuvers and passing maneuvers. In other words, the possible lateral maneuvers and passing maneuvers (e.g., valid remaining options) for each obstacle may be combined to form complete possible actions for the vehicle 804 with respect to each obstacle of the plurality of obstacles 802. For example, the forward search system 550 generates a plurality of combinations (e.g., two or more combinations) of the independently validated passing maneuver and/or the independently validated lateral maneuver.

The forward search system 550 then evaluates the plurality of combinations of the independently validated passing maneuver and/or the independently validated lateral maneuver to define a plurality of valid combinations. The forward search system 550 generates the plurality of valid combinations by at least removing invalid combinations of the passing maneuvers and lateral maneuvers from the plurality of combinations. For example, an impossible combination of the plurality of combinations is removed from the plurality of combinations.

As an example, a first vehicle (e.g., the first obstacle 602) may be positioned on the roadway immediately in front of the vehicle 804. In this example, an "ignore" (e.g., stay behind) passing maneuver is possible and a "left lane boundary crossing" lateral maneuver is possible. Thus, the forward search system 550 would independently validate each of the "ignore" passing maneuver and the "left lane boundary crossing" lateral maneuver as possible options. The forward search system 550 would then evaluate a combination of the "ignore" passing maneuver and the "left lane boundary crossing" lateral maneuver. In this case, the "left lane boundary crossing" lateral maneuver could not be combined with the "ignore" passing maneuver since the vehicle 804 could not both stay behind the first vehicle and go to the left of the first vehicle. As such, the combination of the "ignore" passing maneuver and the "left lane boundary crossing" lateral maneuver would be removed from the plurality of combinations of independently validated passing maneuvers and/or lateral maneuvers.

At 506, the forward search system 550 arranges the decisions with respect to plurality of obstacles 802 to generate the decision tree 600. For example, the forward search system 550 orders the plurality of obstacles (and the corresponding valid combinations) based on a distance (e.g., a spatial position) between the vehicle 804 and the plurality of obstacles 802. In some examples, the obstacle (e.g., the obstacle 602) of the plurality of obstacles 802 positioned at a shortest distance from the vehicle 804 is ordered as first in the first column in the decision tree 600. In some examples, the obstacle (e.g., the obstacle 604) of the plurality of obstacles 802 is positioned along the roadway as being the next shortest distance from the vehicle 804 and is, as a result, ordered as second in the second column of the decision tree 600, and so on. Thus, the plurality of obstacles 802 are sorted in the decision tree 600 based on the order of appearance of the plurality of obstacles 802 relative to the vehicle 804. In other examples, the plurality of obstacles 802 are sorted in the decision tree 600 based on a temporal distance (e.g., an amount of time based on a velocity of the vehicle and/or the obstacle) from the vehicle 804.

In some embodiments, the forward search system 550 generates the reduced decision tree (e.g., reduced relative to at least the decision tree 600) based at least on the plurality of valid combinations by at least excluding (e.g., from the reduced decision tree) a trajectory (e.g., the branch 650) of the plurality of trajectories. For example, at 508 (see FIG. 5), the forward search system 550 performs a tree search of the plurality of possible or valid combinations. During the tree search, the forward search system 550 evaluates the reachability (e.g., spatial and/or temporal reachability) of obstacles within each trajectory relative to a previous obstacle. Based on a determination that a particular trajectory includes at least one obstacle of the plurality of obstacles 802 is unreachable, the forward search system 550 excludes the trajectory when generating the reduced decision tree.

In some embodiments, the forward search system 550 determines at least one obstacle of the plurality of obstacles 802 is unreachable based on a position of the at least one obstacle being outside of a corridor defined by a spatial range and/or a temporal range. The corridor can include at least one (e.g., one, two, three, four, or more) trajectory. For example, the corridor includes the at least one trajectory remaining in the reduced decision tree.

The spatial range and/or the temporal range defines the bounds of the corridor. The spatial range includes a range of linear distances (e.g., at least one linear distance) away from the vehicle 804. In an embodiment, the spatial range is a spatial horizon that is reachable by the vehicle 804 based on a current position of the vehicle 804 and the plurality of obstacles 802 within a trajectory (e.g., branch 650). The temporal range includes a range of temporal distances (e.g., at least one temporal distance) away from the vehicle 804. In an embodiment, the temporal range is a temporal horizon that is reachable by the vehicle 804 based on a current position of the vehicle 804 and the plurality of obstacles 802 within a trajectory (e.g., branch 650). In an embodiment, the spatial range and/or the temporal range includes a linear combination of the spatial range and the temporal range. The spatial range and/or the temporal range can be predetermined. The spatial range and/or the temporal range can be dynamically adjusted by the forward search system 550. Accordingly, a trajectory having at least one obstacle that is outside (e.g., greater than or equal to) the spatial range and/or the temporal range may be excluded when generating the reduced decision tree.

Figure 7:
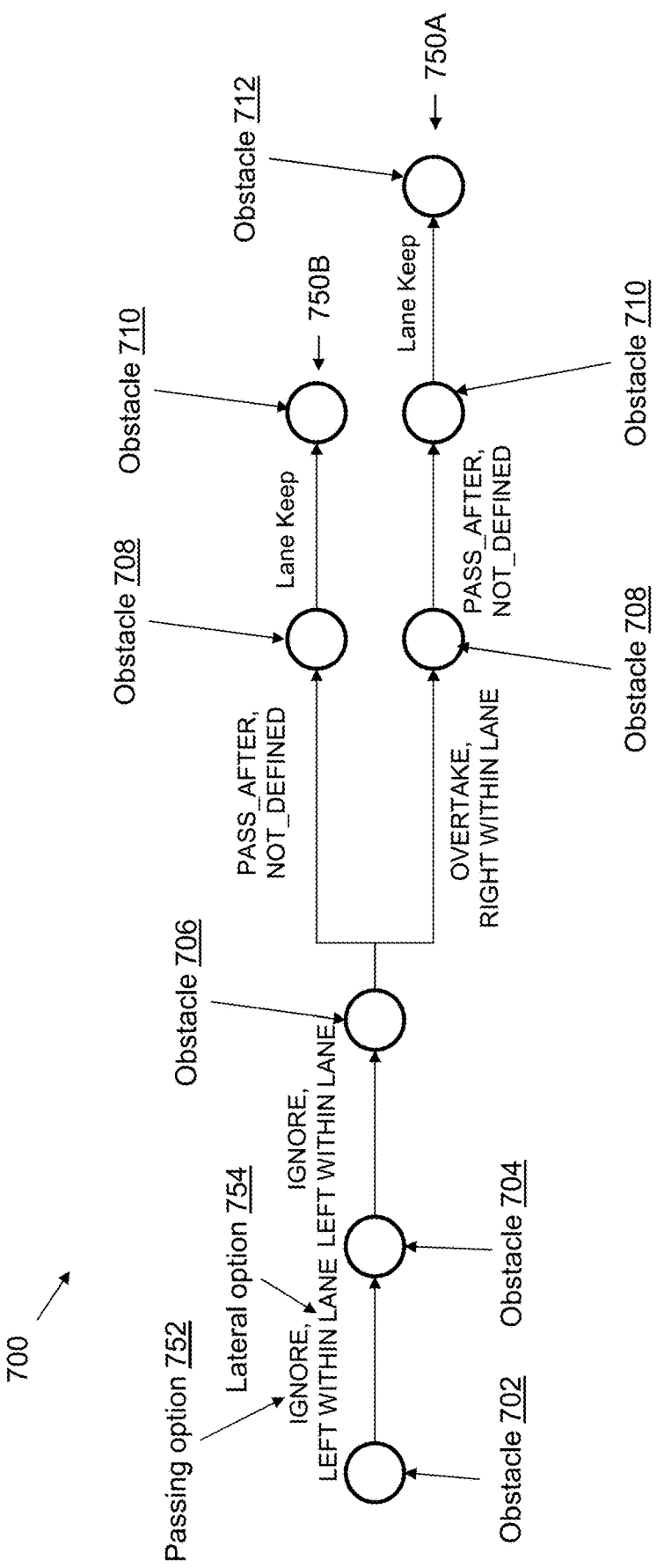
FIG. 7 is a diagram of an example reduced decision tree.

FIG. 7 is a diagram of an example reduced decision tree 700. The reduced decision tree 700 includes two trajectories after excluding the trajectories having at least one obstacle being outside of a corridor defined by a spatial range and/or a temporal range. For example, the reduced decision tree 700 includes a first trajectory 750A including a first obstacle 702 of the plurality of obstacles 802 (corresponding to a column of the decision tree 600), a second obstacle 704 of the plurality of obstacles 802 (corresponding to a column of the decision tree 600), a third obstacle 706 of the plurality of obstacles 802 (corresponding to a column of the decision tree 600), a fourth obstacle 708 of the plurality of obstacles 802 (corresponding to a column of the decision tree 600), a fifth obstacle 710 of the plurality of obstacles 802 (corresponding to a column of the decision tree 600), and a sixth obstacle 712 of the plurality of obstacles 802 (corresponding to a column of the decision tree 600). The reduced decision tree 700 also includes a second trajectory 750B including the first obstacle 702, the second obstacle 704, the third obstacle 706, the fourth obstacle 708, and the fifth obstacle 710.

As shown in FIG. 7, in the first trajectory 750A, the first obstacle 702 corresponds to a first valid combination (e.g. option) of a passing maneuver 752 (e.g., ignore) and a lateral maneuver 754 (e.g., left within lane), the second obstacle 704 corresponds to a second valid combination (e.g. option) of the passing maneuver 752 (e.g., ignore) and the lateral maneuver 754 (e.g., left within lane), the third obstacle 706 corresponds to a third valid combination (e.g. option) of the passing maneuver 752 (e.g., overtake) and the lateral maneuver 754 (e.g., right within lane), the fourth obstacle 708 corresponds to a fourth valid combination (e.g. option) of the passing maneuver 752 (e.g., pass after) and the lateral maneuver 754 (e.g., not defined), the fifth obstacle 710 corresponds to a fifth valid combination (e.g. option) of the passing maneuver 752 (e.g., lane keep) and the lateral maneuver 754 (e.g., lane keep). Further, as shown in FIG. 7, in the second trajectory 750B, the first obstacle 702 corresponds to a first valid combination (e.g. option) of a passing maneuver 752 (e.g., ignore) and a lateral maneuver 754 (e.g., left within lane), the second obstacle 704 corresponds to a second valid combination (e.g. option) of the passing maneuver 752 (e.g., ignore) and the lateral maneuver 754 (e.g., left within lane), the third obstacle 706 corresponds to a third valid combination (e.g. option) of the passing maneuver 752 (e.g., pass after) and the lateral maneuver 754 (e.g., not defined), the fourth obstacle 708 corresponds to a fourth valid combination (e.g. option) of the passing maneuver 752 (e.g., lane keep) and the lateral maneuver 754 (e.g., lane keep).

The forward search system 550 selects an optimal trajectory of the vehicle 804 from the plurality of trajectories of the reduced decision tree 700. Referring to FIG. 7, the forward search system 550 selects an optimal trajectory of the vehicle from between the first trajectory 750A and the second trajectory 750B. Thus, the forward search system 550 quickly and efficiently selects an optimal trajectory for the vehicle based, without evaluating every possible trajectory for the vehicle 804. This reduces computational resource requirements and improves processing efficiency.

Referring now to FIG. 11, illustrated is a flowchart of a process 1100 for graph exploration forward search. In some embodiments, one or more of the steps described with respect to process 1100 are performed (e.g., completely, partially, and/or the like) by forward search system 550. Additionally, or alternatively, in some embodiments one or more steps described with respect to process 1100 are performed (e.g., completely, partially, and/or the like) by another device or group of devices separate from or including forward search system 550.

At 1102, at least one processor (e.g., forward search system 550) detects a plurality of obstacles (e.g., obstacles 802 and/or objects 104a-104n) along a first trajectory of a vehicle (e.g., vehicles 102 and/or vehicle 200). As described herein, the plurality of obstacles includes at least one obstacle, such as a vehicle on the road. In an embodiment, the first trajectory is one of a plurality of trajectories for the vehicle. In other embodiments, the first trajectory is a current trajectory along which the vehicle is currently traveling.

At 1104, the at least one processor determines a plurality of valid combinations of a plurality of trajectories (e.g., branches 650) to handle the plurality of obstacles. The plurality of trajectories may correspond to the plurality of obstacles. The plurality of trajectories include at least one passing maneuver (e.g., ignore, overtake, pass before, pass after, etc.) and/or at least one lateral maneuver (e.g., ignore, undefined, left lane boundary crossing, right lane boundary crossing, left within lane, right within lane, etc.) for each obstacle of the plurality of obstacles. The plurality of valid combinations include combinations of at least two of the plurality of trajectories that are possible based on a position of the vehicle relative to the position of the obstacle.

In an embodiment, the at least one processor independently validates the passing maneuver and/or the lateral maneuver for each obstacle of the plurality of obstacles. For example, the at least one processor determines whether the passing maneuver and/or the lateral maneuver is possible based on a position of the vehicle relative to a position of a particular obstacle. In an embodiment, the at least one processor removes (e.g., excludes), the passing maneuver from a plurality of passing maneuvers and/or the lateral maneuver of a plurality of lateral maneuvers based on independently validating the passing maneuver and/or the lateral maneuver for each obstacle. In other words, the at least one processor removes passing maneuvers and/or lateral maneuvers that are not valid options. In an embodiment, the at least one processor excludes the passing maneuver and/or the lateral maneuver that are not valid options from a reduced decision tree, as described herein.

Additionally and/or alternatively, the at least one processor generates a plurality (e.g., at least two) of combinations of the independently validated passing maneuver and lateral maneuver. The plurality of combinations can be independently validated (e.g., by the at least one processor) to define a plurality of valid combinations. Further, the at least one processor can remove (e.g., exclude) at least one combination of the plurality of combinations based on independently validating the plurality of combinations.

At 1106, the at least one processor generates a reduced decision tree (e.g., the reduced decision tree 700) based at least on the plurality of valid combinations by at least excluding a second trajectory of the plurality of trajectories associated with an obstacle of the plurality of obstacles based on a position of the obstacle being outside a corridor defined by a spatial range and/or a temporal range. The spatial range includes a range of distances from the vehicle. For example, the spatial range includes a threshold distance or distances from the vehicle. The temporal range includes an amount of time away from the vehicle. Thus, the corridor can be defined by a range of distances and/or an amount of time away from the vehicle. The temporal range and/or the spatial range may be adjusted to limit a quantity of combinations remaining in the reduced decision tree. This allows for faster processing of obstacles and determinations by the at least one processor with respect to an optimal trajectory for the vehicle to travel along.

The at least one processor can order the plurality of obstacles in the reduced decision tree based on a distance between the vehicle and the plurality of obstacles. In other words, the obstacle closest to the vehicle is ordered first.

At 1108, the at least one processor selects an optimal trajectory (e.g., the optimal trajectory 908, 1008) of the vehicle from the plurality of trajectories in the reduced decision tree. This allows for the vehicle to quickly and efficiently address the obstacle by considering fewer possible trajectories for the vehicle.

According to some non-limiting embodiments or examples, provided is a system, comprising: at least one processor and at least one memory storing instructions thereon that, when executed by the at least one processor, result in operations comprising: detecting a plurality of obstacles along a first trajectory of a vehicle; determining a plurality of valid combinations of a plurality of trajectories to handle the plurality of obstacles, wherein the plurality of trajectories correspond to the plurality of obstacles; generating a reduced decision tree based at least on the plurality of valid combinations by at least excluding a second trajectory of the plurality of trajectories associated with an obstacle of the plurality of obstacles based on a position of the obstacle being outside of a corridor defined by a spatial range and/or a temporal range; and selecting an optimal trajectory of the vehicle from the plurality of trajectories of the reduced decision tree.

According to some non-limiting embodiments or examples, provided is at least one non-transitory computer-readable medium comprising one or more instructions that, when executed by at least one processor, cause the at least one processor to: detect a plurality of obstacles along a first trajectory of a vehicle; determine a plurality of valid combinations of a plurality of trajectories to handle the plurality of obstacles, wherein the plurality of trajectories correspond to the plurality of obstacles; generate a reduced decision tree based at least on the plurality of valid combinations by at least excluding a second trajectory of the plurality of trajectories associated with an obstacle of the plurality of obstacles based on a position of the obstacle being outside of a corridor defined by a spatial range and/or a temporal range; and select an optimal trajectory of the vehicle from the plurality of trajectories of the reduced decision tree.

According to some non-limiting embodiments or examples, provided is a method, comprising: detecting a plurality of obstacles along a first trajectory of a vehicle; determining a plurality of valid combinations of a plurality of trajectories to handle the plurality of obstacles, wherein the plurality of trajectories correspond to the plurality of obstacles; generating a reduced decision tree based at least on the plurality of valid combinations by at least excluding a second trajectory of the plurality of trajectories associated with an obstacle of the plurality of obstacles based on a position of the obstacle being outside of a corridor defined by a spatial range and/or a temporal range; and selecting an optimal trajectory of the vehicle from the plurality of trajectories of the reduced decision tree.

Further non-limiting aspects or embodiments are set forth in the following numbered clauses:

Clause 1: A system comprising: at least one processor and at least one memory storing instructions thereon that, when executed by the at least one processor, result in operations comprising: detecting a plurality of obstacles along a first trajectory of a vehicle; determining a plurality of valid combinations of a plurality of trajectories to handle the plurality of obstacles, wherein the plurality of trajectories correspond to the plurality of obstacles; generating a reduced decision tree based at least on the plurality of valid combinations by at least excluding a second trajectory of the plurality of trajectories associated with an obstacle of the plurality of obstacles based on a position of the obstacle being outside of a corridor defined by a spatial range and/or a temporal range; and selecting an optimal trajectory of the vehicle from the plurality of trajectories of the reduced decision tree.

Clause 2: The system of clause 1, wherein the plurality of valid combinations comprises combinations of at least two of the plurality of trajectories that are possible based on a position of the vehicle relative to a position of the obstacle.

Clause 3: The system of any one of clauses 1 to 2, wherein the reduced decision tree is further generated by at least including, in the reduced decision tree, at least one trajectory of the plurality of trajectories associated with at least one obstacle of the plurality of obstacles based on a position of the at least one obstacle being within the corridor.

Clause 4: The system of any one of clauses 1 to 3, wherein the plurality of trajectories comprises a passing maneuver and/or a lateral maneuver for each obstacle of the plurality of obstacles; and wherein determining the plurality of valid combinations comprises: independently validating the passing maneuver and/or the lateral maneuver for each obstacle of the plurality of obstacles.

Clause 5: The system of clause 4, wherein determining the plurality of valid combinations further comprises: removing, based on the independently validating the passing maneuver and/or the lateral maneuver for each obstacle, the passing maneuver from a plurality of passing maneuvers and/or the lateral maneuver from a plurality of lateral maneuvers.

Clause 6: The system of any one of clauses 4 to 5, wherein determining the plurality of valid combinations further comprises: generating a plurality of combinations of the independently validated passing maneuver and the lateral maneuver.

Clause 7: The system of clause 6, wherein determining the plurality of valid combinations further comprises: independently validating the plurality of combinations to define the plurality of valid combinations.

Clause 8: The system of clause 7, wherein determining the plurality of valid combinations further comprises: removing, based on the independently validating the plurality of combinations, a combination of the plurality of combinations.

Clause 9: The system of any one of clauses 1 to 8, wherein determining the plurality of valid combinations further comprises ordering the plurality of obstacles in the decision tree based on a distance between the vehicle and the plurality of obstacles.

Clause 10: A method comprising: detecting a plurality of obstacles along a first trajectory of a vehicle; determining a plurality of valid combinations of a plurality of trajectories to handle the plurality of obstacles, wherein the plurality of trajectories correspond to the plurality of obstacles; generating a reduced decision tree based at least on the plurality of valid combinations by at least excluding a second trajectory of the plurality of trajectories associated with the obstacle based on a position of the obstacle being outside of a corridor defined by a spatial range and/or a temporal range; and selecting an optimal trajectory of the vehicle from the plurality of trajectories of the reduced decision tree.

Clause 11: The method of clause 10, wherein the plurality of valid combinations comprises combinations of at least two of the plurality of trajectories that are possible based on a position of the vehicle relative to a position of the obstacle.

Clause 12: The method of any one of clauses 10 to 11, wherein the reduced decision tree is further generated by at least including, in the reduced decision tree, at least one trajectory of the plurality of trajectories associated with at least one obstacle of the plurality of obstacles based on a position of the at least one obstacle being within the corridor.

Clause 13: The method of any one of clauses 10 to 12, wherein the plurality of trajectories comprises a passing maneuver and/or a lateral maneuver for each obstacle of the plurality of obstacles; and wherein determining the plurality of valid combinations comprises: independently validating the passing maneuver and/or the lateral maneuver for each obstacle of the plurality of obstacles.

Clause 14: The method of clause 13, wherein determining the plurality of valid combinations further comprises: removing, based on the independently validating the passing maneuver and/or the lateral maneuver for each obstacle, the passing maneuver from a plurality of passing maneuvers and/or the lateral maneuver from a plurality of lateral maneuvers.

Clause 15: The method of any one of clauses 10 to 14, wherein determining the plurality of valid combinations further comprises: generating a plurality of combinations of the independently validated passing maneuver and the lateral maneuver.

Clause 16: The method of clause 15, wherein determining the plurality of valid combinations further comprises: independently validating the plurality of combinations to define the plurality of valid combinations.

Clause 17: The method of clause 16, wherein determining the plurality of valid combinations further comprises: removing, based on the independently validating the plurality of combinations, a combination of the plurality of combinations.

Clause 18: The method of any one of clauses 10 to 17, wherein determining the plurality of valid combinations further comprises ordering the plurality of obstacles in the decision tree based on a distance between the vehicle and the plurality of obstacles.

Clause 19: At least one non-transitory storage media storing instructions that, when executed by at least one processor, cause the at least one processor to: detect a plurality of obstacles along a first trajectory of a vehicle; determine a plurality of valid combinations of a plurality of trajectories to handle the plurality of obstacles, wherein the plurality of trajectories correspond to the plurality of obstacles; generate a reduced decision tree based at least on the plurality of valid combinations by at least excluding a second trajectory of the plurality of trajectories associated with an obstacle of the plurality of obstacles based on a position of the obstacle being outside of a corridor defined by a spatial range and/or a temporal range; and select an optimal trajectory of the vehicle from the plurality of trajectories of the reduced decision tree.

Clause 20: The at least one non-transitory storage media of clause 19, wherein the plurality of trajectories comprises a passing maneuver and/or a lateral maneuver for each obstacle of the plurality of obstacles; and wherein the instructions that cause the at least one processor to determine the plurality of valid combinations cause the at least one processor to: independently validate the passing maneuver and/or the lateral maneuver for each obstacle of the plurality of obstacles.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A system comprising:
at least one processor; and
at least one memory storing instructions thereon that, when executed by the at least one processor, result in operations comprising:
detecting a plurality of obstacles along a first trajectory of a vehicle;
determining a plurality of valid combinations of a plurality of trajectories representing a passing maneuver and a lateral maneuver to navigate through an environment including the plurality of obstacles and the vehicle, wherein a combination of the passing maneuver and the lateral maneuver is valid when the combination is physically possible based on a position of the vehicle relative to a position of at least one obstacle;
generating a reduced decision tree based at least on the plurality of valid combinations by at least excluding a second trajectory of the plurality of trajectories based on a position of a corresponding obstacle being outside of a corridor defined by a spatial range and/or a temporal range, wherein the spatial range and/or the temporal range is adjusted to limit a quantity of valid combinations remaining in the reduced decision tree; and
controlling operation of the vehicle according to an optimal trajectory of the vehicle selected from the plurality of trajectories of the reduced decision tree.

2. The system of claim 1, wherein the reduced decision tree is further generated by at least including, in the reduced decision tree, at least one trajectory of the plurality of trajectories associated with at least one obstacle of the plurality of obstacles based on a position of the at least one obstacle being within the corridor.

3. The system of claim 1, wherein determining the plurality of valid combinations comprises: independently validating the passing maneuver and/or the lateral maneuver for each obstacle of the plurality of obstacles.

4. The system of claim 3, wherein determining the plurality of valid combinations further comprises: removing, based on the independently validating the passing maneuver and/or the lateral maneuver for each obstacle, the passing maneuver from a plurality of passing maneuvers and/or the lateral maneuver from a plurality of lateral maneuvers.

5. The system of claim 4, wherein determining the plurality of valid combinations further comprises: generating a plurality of combinations of the independently validated passing maneuver and the lateral maneuver.

6. The system of claim 5, wherein determining the plurality of valid combinations further comprises: independently validating the plurality of combinations to define the plurality of valid combinations.

7. The system of claim 6, wherein determining the plurality of valid combinations further comprises: removing, based on the independently validating the plurality of combinations, a combination of the plurality of combinations.

8. The system of claim 1, wherein determining the plurality of valid combinations further comprises ordering the plurality of obstacles in the decision tree based on a distance between the vehicle and the plurality of obstacles.

9. A method comprising:

detecting a plurality of obstacles along a first trajectory of a vehicle;

determining a plurality of valid combinations of a plurality of trajectories representing a passing maneuver and a lateral maneuver to navigate through an environment including the plurality of obstacles and the vehicle, wherein a combination of the passing maneuver and the lateral maneuver is valid when the combination is physically possible based on a position of the vehicle relative to a position of at least one obstacle;

generating a reduced decision tree based at least on the plurality of valid combinations by at least excluding a second trajectory of the plurality of trajectories based on a position of a corresponding obstacle being outside of a corridor defined by a spatial range and/or a temporal range, wherein the spatial range and/or the temporal range is adjusted to limit a quantity of valid combinations remaining in the reduced decision tree; and controlling operation of the vehicle according to an optimal trajectory of the vehicle selected from the plurality of trajectories of the reduced decision tree.

10. The method of claim 9, wherein the reduced decision tree is further generated by at least including, in the reduced decision tree, at least one trajectory of the plurality of trajectories associated with at least one obstacle of the plurality of obstacles based on a position of the at least one obstacle being within the corridor.

11. The method of claim 9, wherein determining the plurality of valid combinations comprises: independently validating the passing maneuver and/or the lateral maneuver for each obstacle of the plurality of obstacles.

12. The method of claim 11, wherein determining the plurality of valid combinations further comprises: removing, based on the independently validating the passing maneuver and/or the lateral maneuver for each obstacle, the passing maneuver from a plurality of passing maneuvers and/or the lateral maneuver from a plurality of lateral maneuvers.

13. The method of claim 12, wherein determining the plurality of valid combinations further comprises: generating a plurality of combinations of the independently validated passing maneuver and the lateral maneuver.

14. The method of claim 13, wherein determining the plurality of valid combinations further comprises: independently validating the plurality of combinations to define the plurality of valid combinations.

15. The method of claim 14, wherein determining the plurality of valid combinations further comprises: removing, based on the independently validating the plurality of combinations, a combination of the plurality of combinations.

16. The method of any one of claim 9, wherein determining the plurality of valid combinations further comprises ordering the plurality of obstacles in the decision tree based on a distance between the vehicle and the plurality of obstacles.

17. At least one non-transitory storage media storing instructions that, when executed by at least one processor, cause the at least one processor to:

detect a plurality of obstacles along a first trajectory of a vehicle;

determine a plurality of valid combinations of a plurality of trajectories representing a passing maneuver and a lateral maneuver to navigate through an environment including the plurality of obstacles and the vehicle, wherein a combination of the passing maneuver and the lateral maneuver is valid when the combination is physically possible based on a position of the vehicle relative to a position of at least one obstacle;

generate a reduced decision tree based at least on the plurality of valid combinations by at least excluding a second trajectory of the plurality of trajectories based on a position of a corresponding obstacle being outside of a corridor defined by a spatial range and/or a temporal range, wherein the spatial range and/or the temporal range is adjusted to limit a quantity of valid combinations remaining in the reduced decision tree; and controlling operation of the vehicle according to an optimal trajectory of the vehicle selected from the plurality of trajectories of the reduced decision tree.

18. The at least one non-transitory storage media of claim 17, wherein the plurality of trajectories comprises a passing maneuver and/or a lateral maneuver for each obstacle of the plurality of obstacles; and wherein the instructions that cause the at least one processor to determine the plurality of valid combinations cause the at least one processor to:

independently validate the passing maneuver and/or the lateral maneuver for each obstacle of the plurality of obstacles.

* * * * *